United States Patent
Yamagishi et al.

(10) Patent No.: US 6,771,419 B1
(45) Date of Patent: Aug. 3, 2004

(54) REAR PROJECTION TYPE IMAGE DISPLAY UNIT

(75) Inventors: Shigekazu Yamagishi, Osaka (JP); Hiroshi Miyai, Hyogo (JP); Hiroshi Yamaguchi, Osaka (JP); Kenichi Ikeda, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/869,498
(22) PCT Filed: Oct. 30, 2000
(86) PCT No.: PCT/JP00/07653
§ 371 (c)(1), (2), (4) Date: Jun. 28, 2001
(87) PCT Pub. No.: WO01/33296
PCT Pub. Date: May 10, 2001

(30) Foreign Application Priority Data

Nov. 1, 1999 (JP) ............................................. 11-310557

(51) Int. Cl.$^7$ .......................... G03B 21/60; G03B 21/56
(52) U.S. Cl. ....................... 359/457; 359/453; 359/460
(58) Field of Search ................................ 359/452–453, 359/455–457, 460

(56) References Cited

U.S. PATENT DOCUMENTS

| | | | |
|---|---|---|---|
| 4,054,907 A | | 10/1977 | Itoh et al. .................... 348/780 |
| 4,431,266 A | * | 2/1984 | Mori et al. ................... 359/456 |
| 5,365,369 A | * | 11/1994 | Ogino et al. ................. 359/457 |
| 5,485,308 A | * | 1/1996 | Hirata et al. ................. 359/457 |
| 5,563,738 A | | 10/1996 | Vance ......................... 359/614 |
| 6,185,038 B1 | * | 2/2001 | Yamaguchi et al. ........ 359/457 |
| 6,261,402 B1 | * | 7/2001 | Watanabe et al. ........... 156/230 |
| 6,278,546 B1 | * | 8/2001 | Dubin et al. ................. 359/452 |
| 6,421,181 B1 | * | 7/2002 | Yoshida et al. ............. 359/619 |
| 6,469,830 B1 | * | 10/2002 | Dubin et al. ................. 359/449 |
| 6,502,942 B2 | * | 1/2003 | Mori et al. ................... 353/74 |
| 6,665,118 B2 | * | 12/2003 | Yamaguchi et al. ........ 359/453 |
| 2002/0080483 A1 | * | 6/2002 | Yamaguchi et al. ........ 359/456 |

FOREIGN PATENT DOCUMENTS

| | | |
|---|---|---|
| EP | 0 818 708 | 1/1998 |
| EP | 0 825 460 | 2/1998 |
| JP | 51-100723 | 9/1976 |
| JP | 51-111261 | 10/1976 |
| JP | 4-299326 | 10/1992 |
| JP | 6-130496 | 5/1994 |
| JP | 9-504882 | 5/1997 |
| JP | 10-111537 | 4/1998 |
| JP | 10-160911 | 6/1998 |
| JP | 10-339915 | 12/1998 |
| WO | WO 95/06888 | 3/1995 |

OTHER PUBLICATIONS

International Search Report, Dec. 26, 2000.

* cited by examiner

*Primary Examiner*—Russell Adams
*Assistant Examiner*—Magda Cruz
(74) *Attorney, Agent, or Firm*—Merchant & Gould, P.C.

(57) ABSTRACT

Color lights from image projecting sections (207) that enlarge and project images of red, green and blue, respectively, are made incident on a transparent screen at different angles of incidence, so that image synthesis is carried out. The color lights projected are converted into telecentric light by a Fresnel lens (211), and after principal rays of the respective color lights are converted into substantially parallel rays by a color shading eliminating means (219) provided with lenticular lenses on both sides thereof, the rays are incident on a light diffusing means (224). The light diffusing means (224) is formed with a transparent substrate sheet and a plurality of transparent micro beads made to adhere onto a light-incident surface of the substrate sheet with an opaque adhesive. Image light passes through light transmitting portions between the substrate sheet and the micro beads to be diffused. This configuration enables to provide a rear-projection image display whose display images are hardly affected by external light, which has an increased angle of visibility, and which undergoes less color shading, without a decrease in light utilization efficiency.

9 Claims, 11 Drawing Sheets

REAR PROJECTION TYPE IMAGE DISPLAY UNIT

TECHNICAL FIELD

The present invention relates to a rear-projection image display. More specifically, the present invention relates to a rear-projection image display in which image display is conducted by superimposing projection images on a transparent screen, the projection images being projected from a plurality of image displays juxtaposed in a common horizontal plane.

BACKGROUND ART

The following description will depict a conventional rear-projection image display, while referring to the drawings.

FIG. 7 is a plan view illustrating an overall configuration of a conventional three-tube rear-projection image display 100. The rear-projection image display (video projector) 100 presently is a main item in the market of large video-image display for home use. Images on three image display elements (CRTs) 101, 102, and 103 corresponding to three colors of red, green and blue colors, respectively, are enlarged and projected by projection lenses 104, 105, and 106, respectively, so as to be synthesized on a transparent screen. The transparent screen includes a Fresnel lens 107 as collimating means and a lenticular lens sheet 108 as a light diffusing means. Such a transparent screen can collimate respective principal rays of color lights incident from different directions and then allows the same to leave. Hence, a phenomenon can be corrected in which shade of color varies with positions where the observer stands (color shading). In addition, on a light-outgoing surface of the lenticular lens sheet 108, black stripes 109 are provided between adjacent lenticular lenses so as to prevent black dimming from occurring due to external light, and thus to prevent lowering of the contrast of images. Furthermore, surfaces of the lenticular lenses between the black stripes 109 are coated with a diffusing material, or a diffusing material is mixed in the lenticular lens sheet 108, so that visibility is secured in a vertical direction.

On the foregoing transparent screen, however, light source images of three different color lights are formed at different positions within an aperture between adjacent black stripes 109, as illustrated in FIG. 8. Therefore, in order to avoid optical loss, it is necessary to make each space between the black stripes 109 sufficiently wide with respect to the foregoing light source images. This causes the black stripes 109 to be sparsely provided. Consequently, it has been impossible to suppress sufficiently the black dimming caused by the diffusing material reflecting external light that has entered through the aperture.

Screens that solve such a problem recently have been proposed, which are as described below. Such screens include: a first type of screen disclosed in JP 9(1997)-504882 A in which transparent beads are used; a second type of screen is disclosed in JP 10(1998)-339915 A in which black stripes are used; and a third type of screen is disclosed in the JP 10(1998)-111537 A in which a color layer is used.

A configuration of a transparent screen of the first type using transparent beads is shown in FIG. 9. Micro beads 111 made of a transparent material are fixed to a substrate panel 110 made of a light-transmitting material with a light absorbing adhesive 112 used therebetween. Light having passed through the Fresnel lens 107 is converged by the beads 111 so as to be focused on portions (apertures) where the beads 111 and the substrate panel 110 are in contact with each other. Since the adhesive 112 is absent at these portions, the light passes through the substrate panel 110 to leave as diffused light. Each of the portions (apertures) where the beads 111 and the substrate panel 110 are in contact with each other is a very small point that occupies an area that hardly can be recognized when viewed from the observer side, and areas of the screen surface other than the apertures are covered with the light absorbing adhesive. Most of external light incident on the screen from the surroundings therefore is incident on and absorbed by the adhesive, never to be reflected toward the observer side. In this screen, such very small beads 111 allow high-definition display to be provided. Besides, the black level hardly is impaired even when strong external light is incident on the screen. Consequently, the contrast of images hardly is impaired.

A configuration of a transparent screen of the second type using black stripes is shown in FIG. 10. A lenticular lens sheet 113 includes lenticular lenses on a light-incident surface thereof, and a diffusing layer 116 is laminated on a light-outgoing surface of the lenticular lens sheet 113. Black stripes 115 are formed on a light-outgoing surface of the diffusing layer 116, and the diffusing layer 116 is laminated with a front panel 114 with a transparent adhesive layer being provided therebetween. Light having passed through a Fresnel lens 107 enters the lenticular lenses, is converged onto apertures between the black stripes 115 or the vicinities thereof, passes through the front panel 114, and exits as diffused light. In the foregoing process, when passing through the diffusing layer 116, image light is diffused in horizontal and vertical directions. Since the lenticular lenses that are very small are used to converge the image light, it is possible to narrow the spaces between the black stripes 115. This allows a proportion of areas of the black stripes 115 to be increased, thereby causing most of the external light incident on the screen to be absorbed by the black stripes 115, never to be reflected toward the observer side. This configuration of the screen therefore allows the lenticular sheet 113 to be formed thinly, thereby allowing the black stripes 115 to be provided at a fine pitch. Consequently, a high-definition display can be provided. Besides, the black level hardly is impaired even when strong external light is incident on the screen. This results in that the contrast of images hardly is impaired.

A configuration of a transparent screen of the third type using a color layer is shown in FIG. 11. A lenticular lens sheet 118 includes lenticular lenses 117 on a light-incident surface thereof, and a color layer 119 is provided in the vicinity of the light-incident surface of the lenticular lenses 117. A material of the lenticular lens sheet 118 as a substrate is either non-colored, or colored to have a lighter tint than that of the color layer 119. Light having passed through a Fresnel lens 107 enters the color layer 119. After passing through the color layer 119, the light enters the lenticular lenses 117. The light is converged by the lenticular lenses 117 and is allowed to exit as diffused light to the observer side.

On the other hand, among external light from the surroundings, light incident to the color layer 119 at a small angle of incidence passes through the color layer 119 and is absorbed into a case, with substantially no light going back to the screen. Therefore, the light incident to the layer 119 at a small angle of incidence is not harmful. Moreover, light incident on the color layer 119 at a great angle of incidence is subjected to total reflection at an interface between the color layer 119 and an air layer. Normally the total reflection is repeated several times, and then some light follows an optical path going back to the observer side However, since a distance for passage through the color layer 119 increases as the total reflection is repeated, most of the light therefore is absorbed by the color layer 119. Thus, this screen allows the lenticular lens sheet 118 to be formed thinly, thereby allowing the lenticular lenses 117 to be provided at a fine pitch. Consequently, a high definition display call be provided. Moreover, since the foregoing screen hardly allows external light incident on the screen to be reflected to the observer side without remarkable degradation of image light, incidence of strong external light onto the screen hardly causes the black level to lower, hence hardly causing the contrast of images to deteriorate.

In either of the foregoing screen using transparent beads or that using the black stripes, however, it is required to converge image light to the apertures each having a very small area by means of the light-incident-side lenses (the beads in the bead-using type, or the lenticular lenses in the black-stripe-using type). No problem occurs in the case where the screen is used in a display in which an image on the image display element for displaying color images is enlarged and projected by means of one projection lens. However, the following problem occurs in the case where the screen is used in a currently predominant projector in which images of the three CRTs are enlarged and projected by three projection lenses, respectively, to be superimposed on the screen, as shown in FIG. 7. Namely, since respective color lights are incident at different angles on the light-incident-side lenses, positions where the color lights are converged are different from one another. Accordingly, when the apertures are formed to be smaller, the color lights from the CRTs other than that positioned at the center are converged on a light absorbing layer, thereby resulting in a considerable decrease in light utilization efficiency and coloration out of balance.

Furthermore, when the screen with the color layer is used in the aforementioned projector in which images of three CRTs are enlarged and projected by three projection lenses, respectively, to be superimposed on one another on the screen, color lights of image light are incident on the light-incident-side lenses (lenticular lenses) at different angles of incidence, respectively. Accordingly, the respective color lights have different outgoing light intensity distributions, and this causes significant color shading.

As described above, the conventionally-proposed transparent screen does not have a drawback when being used as a screen in an image display in which a color image is enlarged and projected by means of one projection lens, but causes the following problem when being used as a screen in a currently predominant projector in which color images are superimposed on the screen using three CRTs and three projection lenses for respective colors. Namely, the respective color lights are incident on the light-incident-side lenses at different angles. Therefore, color lights from the CRTs other than the CRT positioned at the center are converged to the light absorbing layer, and this results in a drastic decrease in the light utilization efficiency and distortion of color balance. Furthermore, color shading, etc. also occurs.

DISCLOSURE OF THE INVENTION

An object of the present invention is to provide a rear-projection image display provided with three sets of image display elements and illuminating lenses for color lights, respectively. The rear-projection image display overcomes the aforementioned problems that tend to occur when the conventional transparent screen is used, and avoids the black dimming and the lowering of contrast due to entrance of external light.

To achieve the foregoing object, the present invention employs the following configuration.

A rear-projection image display of the present invention includes a trichromatic image projecting section, and a transparent screen on which images formed with respective color lights projected by the trichromatic image projecting section are superimposed to be displayed.

The foregoing trichromatic image projecting section includes three image projecting sections corresponding to colors of red, green and blue, respectively, the three image projecting sections being arrayed in one horizontal plane, each of the three image projecting sections including an image display element for displaying an image according to an input signal, and an illuminating lens for enlarging and projecting the image displayed by the image displays element.

The transparent screen includes, in an order from a side of the trichromatic image projecting section, a collimating means, a color-shading eliminating means, and a light diffusing means.

The foregoing collimating means converts incident light having a predetermined flare angle from each of the image projecting sections into telecentric light and allows the telecentric light to leave therefrom;

The foregoing color-shading eliminating means has, on its light-incident surface, light-incident-side lenticular lenses for converging incident light from the collimating means in a horizontal plane, and on its light-outgoing surface, light-exit-side lenticular lenses having one-to-one correspondence to the light-incident-side lenticular lenses, so as to allow principal rays of the respective lights of the colors to be substantially parallel with one another and to exit, the respective lights being from the image projecting sections and having passed through the collimating means.

According to a first configuration of the foregoing light diffusing means, the light diffusing means includes a substrate sheet, made of a transparent material and a plurality of micro beads made of a transparent material provided on the light-incident surface of the substrate sheet, light transmitting portions are formed between the substrate sheet and the micro beads, and the light-incident surface of the substrate sheet except for the light transmitting portions are covered with an opaque binder.

According to a second configuration of the light diffusing means, the light diffusing means includes, on its light-incident surface lenticular lenses that converge incident light from the color-shading eliminating means in a horizontal plane, black stripes formed with a material having a light absorbing property in a region except for places where the incident light is converged and vicinities thereof, and a light diffusing layer made of a material containing a light diffusing material.

According to a third configuration of the light diffusing means, the light diffusing means includes a substrate having, on its light-incident surface, lenticular lenses for converging incident light from the color-shading eliminating means in a horizontal plane, and a color layer formed at least in vicinities of light-incident surfaces of the lenticular lenses, a material of the substrate being non-colored, or colored to have a tint lighter than that of the color layer.

In the above-described rear-projection image display of the present invention, principal rays of the respective color lights that are incident at different angles are converted into substantially parallel rays by the color-shading eliminating means, and thereafter they are made to enter the light diffusing means that hardly is affected by external light. It is therefore possible to provide a projector (for instance, a three-CRT-type projector) equipped with a plurality of image projecting sections, in which display images hardly are affected by external light, an increased angle of visibility is provided, and less color shading is caused without a decrease in the light utilization efficiency.

The collimating means preferably is a Fresnel lens sheet and its focal length is substantially equal to a distance from the collimating means to each of the three image projecting sections. This preferable configuration allows the collimating means for obtaining telecentric light to be formed thinner and smaller in size.

The light-exit-side lenticular lenses of the color-shading eliminating means preferably are placed substantially at positions where the light-incident-side lenticular lenses form images, respectively. Besides, a focal length of each of the light-exit-side lenticular lenses of the color-shading eliminating means is substantially equal to a distance therefrom to a corresponding one of the light-incident-side lenticular lenses. This preferable configuration allows principal rays of the respective color lights that are incident at different angles of incidence to outgo in a substantially parallel state, and also allows the respective color lights that are incident in a substantially parallel state to be converged efficiently.

Each of the light-exit-side lenticular lenses of the color-shading eliminating means preferably has a width in a horizontal direction, the width covering an area where an image of the trichromatic image projecting section is formed by each of the light-incident-side lenticular lenses corresponding to each of the light-exit-side lenticular lenses. This preferable configuration enables to avoid both stray light and reduction of light utilization efficiency.

A width in a horizontal direction of the light-exit-side lenticular lenses of the color-shading eliminating means preferably is narrower than a width in the horizontal direction of the light-incident-side lenticular lenses, and a light absorbing agent is applied to spaces between any adjacent two of the light-exit-side lenticular lenses. This preferable configuration further enables securely avoiding stray light.

The color-shading eliminating means preferably is a lenticular lens sheet provided with the light-incident-side lenticular lenses on one surface thereof, and the light-exit-side lenticular lenses on the other surface thereof. By integrally providing the light-incident-side lenticular lenses and the light-exit-side lenticular lenses, the color-shading eliminating means can be formed smaller and thinner in size, and cost reduction call be achieved as well.

BEST MODE FOR CARRYING OUT THE INVENTION

First Embodiment

Figure 1:
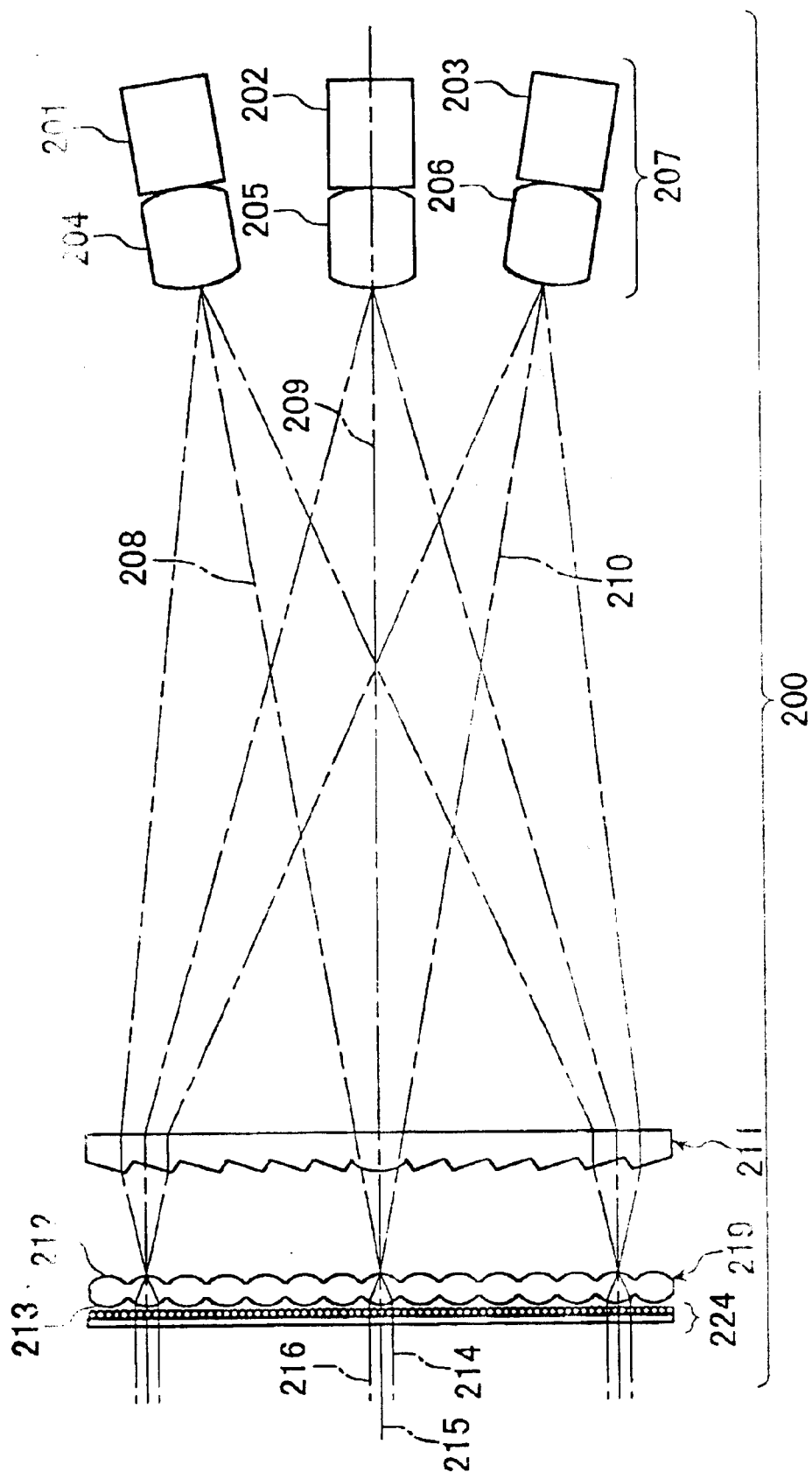
FIG. 1 is a view illustrating an overall configuration of a rear-projection image display according to a first embodiment of the present invention.
Figure 2:
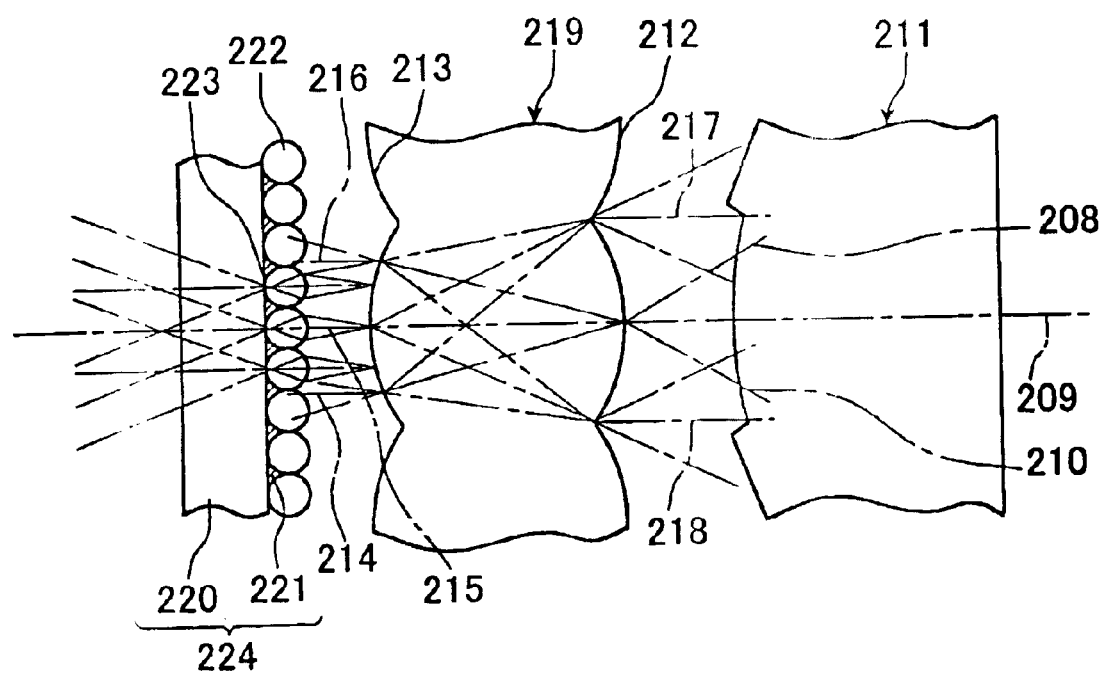
FIG. 2 is an enlarged cross-sectional view of a portion of a transparent screen shown in FIG. 1.

FIG. 1 is a plan view illustrating a schematic configuration of a rear-projection image display according to a first embodiment. FIG. 2 is an enlarged cross-sectional view of a portion in the vicinity of a screen section shown in FIG. 1.

A projection-type image display 200 according to the present embodiment includes a trichromatic image projecting section 207, a Fresnel lens 211 as a collimating means, a lenticular lens sheet 219 as a color-shading eliminating means, and a bead-type diffusing panel 224 as a light diffusing means, which are provided in the stated order.

The trichromatic image projecting section 207 includes: a red image display element (CRT) 201, a green image display element (CRT) 202, and a blue image display element (CRT) 203 that are linearly aligned in a horizontal direction; and illuminating lenses 204, 205, and 206 that are provided in front of the image display elements, respectively. The image display elements 201, 202, and 203 carry out image display of colors, respectively, according to input signals, and the respective images are enlarged and projected by the illuminating lenses 204, 205, and 206 onto the Fresnel lens 211.

The Fresnel lens 211 is disposed at a position such that distances from light exit aperture of the illuminating lenses 204, 205, and 206 to the Fresnel lens 211 are substantially equal to a focal length of the Fresnel lens 211. The Fresnel lens 211 converts the respective color lights from the trichromatic image display section 207 into lights substantially parallel to principal rays 208, 209, and 210 of the respective color lights, and allows the lights thus converted to exit therefrom.

The lenticular lens sheet 219 includes lenticular lenses arrayed on both the surfaces thereof in the same direction at the same pitch with the respective lenses on both the surfaces opposing each other in a one-to-one correspondence. Each lenticular lens 212 on the light-incident side has a focal length substantially equal to a distance therefrom to the corresponding lenticular lens 213 on the light-outgoing side. Each lenticular lens 213 has a focal length substantially equal to a distance therefrom to the corresponding lenticular lens 212 on the light incident side.

Here, focusing on the respective principal rays 208, 209, and 210 of the color lights that are incident on a surface of a lenticular lens 212 at its center, the positions of incidence of these principal rays coincide with incident-side focal positions of the lenticular lens 213 on the light-outgoing side. As shown in FIG. 2, therefore, these rays are allowed to exit from the lenticular lens 213 as principal rays 214, 215, and 216 that are substantially parallel with each other. Further, focusing on green lights 217, 209, and 218 that enter the lenticular lens 212 as substantially parallel lights, these lights are converged to a center of a surface of the lenticular lens 213, since the focal position of the lenticular lens 212 coincides with a position of the lenticular lens 213. Likewise, red and blue lights enter the lenticular lens 212 as lights parallel with the principal rays 208 and 210, respectively. Hence, they are converged on a surface of the lenticular lens 213, at positions adjacent to the converging positions of the foregoing green light.

A bead-type diffusing panel 224 is composed of a transparent panel 220 and a plurality of beads 222 made of a transparent material that transmits light, with the beads 222 being fixed to the transparent panel 220 using a black adhesive 221 having a light absorption function. The transparent panel 220 and the respective beads 222 are in contact with each other at their apertures 223, and the surface of the transparent panel 220 other than the apertures 223 is covered with the adhesive 221. Accordingly, among light incident on the bead-type diffusing panel 224, light incident on the apertures 223 pass through the bead-type diffusing panel 224, but light incident on the other areas is absorbed by the adhesive 221. The bead-type diffusing panel 224 is disposed with its surface to which the beads 222 adhere facing the lenticular lens sheet 219. Outgoing light from the lenticular lens sheet 219 is incident on the beads 222 of the bead-type diffusing panel 224. When the incident light is parallel light, the incident light is converged to the apertures 223 due to a refracting effect of the beads 222, and passes therethrough, to go through the transparent panel 220 to the observer side. Here, in the case where the index of refraction of the beads 222 is increased so as to increase the angle of incidence to the apertures 223, the outgoing angle also increases. Hence, the bead-type diffusing panel 224 thus configured can be used as a diffusing means that provides a greater angle of visibility.

The above-described trichromatic image projecting section 207, Fresnel lens 211, lenticular lens sheet 219, and bead-type diffusing panel 224 are placed in a case, not shown in the figures, in which the bead-type diffusing panel 224 constitutes a part of external surfaces of the case.

An area that the apertures 223 of the bead-type diffusing panel 224 closest to the observer occupy is extremely small relative to the entire area of the diffusing panel 224. Even when strong external light is incident from the observer side, most of the light is absorbed by the adhesive 221, thereby not to return to the observer side. Besides, light passing through the aperture 223 enters the case and does not return by passing through the aperture 223 again, thereby by no means being observed by the observer. Accordingly, sharp black can be provided at all times independently of an environment. On the other hand, since respective principal rays of color lights incident on the bead-type diffusing panel 224 from the image projecting section 207 are substantially parallel to one another, color lights outgoing from the diffusing panel 224 have substantially equal outgoing angle distributions. Therefore, images that undergo no color shading but are reproduced with each color being uniform can be provided to the observer.

In the foregoing configuration, each of the lenticular lenses 212 of the lenticular lens sheet 219 as a color-shading eliminating means forms light-exit-aperture images of the illuminating lenses 204, 205, and 206 at different positions on the corresponding lenticular lens 213 arranged to face the lenticular lens 212. Here, a thickness of the lenticular lens sheet 219 and a width of the lenticular lens 213 are determined so that light source images (light-outgoing-pupil images) of the three color lights fall within a width of each lenticular lens 213 (one pitch).

If the sheet 219 is formed thinner without changing the lens pitch, it is necessary to shorten the focal length of the lenticular lens 212. In this case, an image formed on the lenticular lens 213 can be made smaller, but a flare angle of the outgoing light increases. This makes it impossible to converge all the light incident on the bead-type diffusing panel 224 to the apertures 223, and thus optical loss may be caused.

On the other hand, if the sheet 219 is formed thicker without changing the lens pitch, it is necessary to lengthen the focal length of the lenticular lens 212. In this case, an image formed on the lenticular lens 213 becomes larger. Accordingly, light likely fails to be incident on the corresponding lenticular lens 213, but is incident on adjacent lenses (stray light), and thus optical loss may be caused.

It is therefore desirable to employ a configuration excelling most in light utilization characteristics, by ascertaining: sizes of light-exit-aperture images of the illuminating lenses 204, 205, and 206, arid spaces therebetween; distances from the illuminating lenses 204, 205, and 206 to the lenticular lens sheet 219; pitches and focal lengths of the lenticular lenses 212 and 213; and incident-angle-dependent characteristics of light transmittance of the bead-type diffusing panel 224.

Furthermore, in the case where the light source images can be formed sufficiently small on the lenticular lenses 213, black stripes as a light absorbing layer may be provided in regions between adjacent lenticular lenses 213 in which light source images are not formed. By so doing, image-quality degrading factors such as color mixture due to stray light can be surely removed.

In the foregoing head-type diffusing panel 224, the beads 222 and the transparent panel 220 are fixed in contact with each other, but they do not necessarily have to be in contact with each other. It should be appreciated that any bead-type diffusing panel can be applicable as long as it is configured so that light converged by the beads 222 is allowed to reach the transparent panel 220 (a configuration with no light blocking material in light transmitting portions).

In the foregoing example, used as a color-shading eliminating means is the one-piece lenticular lens sheet 219 having the lenticular lenses 212 and 213 on both surfaces thereof, respectively. However, it may be formed with two pieces of lenticular lens sheets, as in the third embodiment described later.

The bead-type diffusing panel 224 shown in the present embodiment particularly has a characteristic of hardly undergoing degradation of image quality due to external light, as compared with a light diffusing means in the embodiments described later. According to the first embodiment, therefore, it is possible to provide an image display with high contrast, even under particularly strong external light.

Second Embodiment

Figure 3:
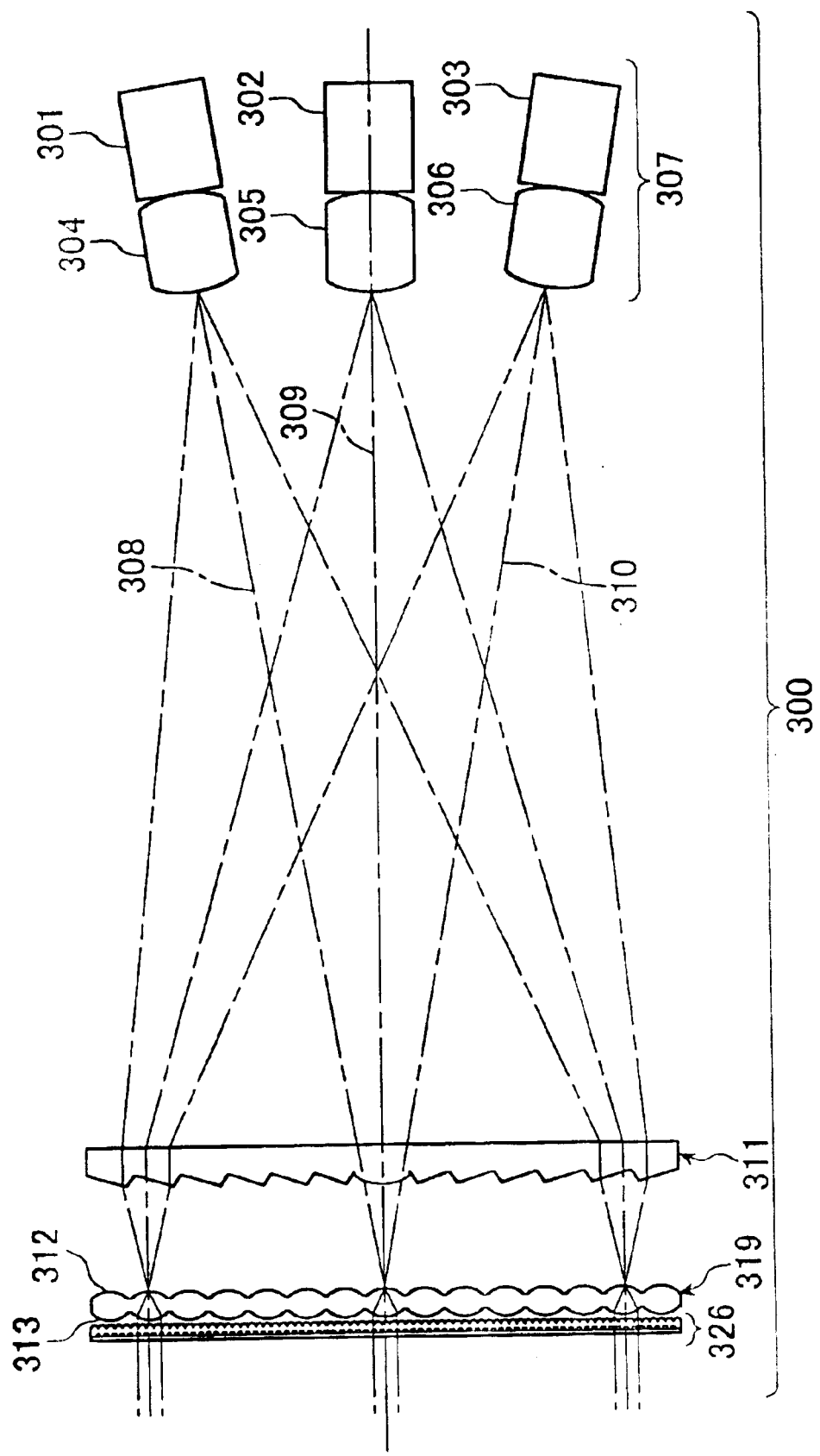
FIG. 3 is a view illustrating an overall configuration of a rear-projection image display according to a second embodiment of the present invention.
Figure 4:
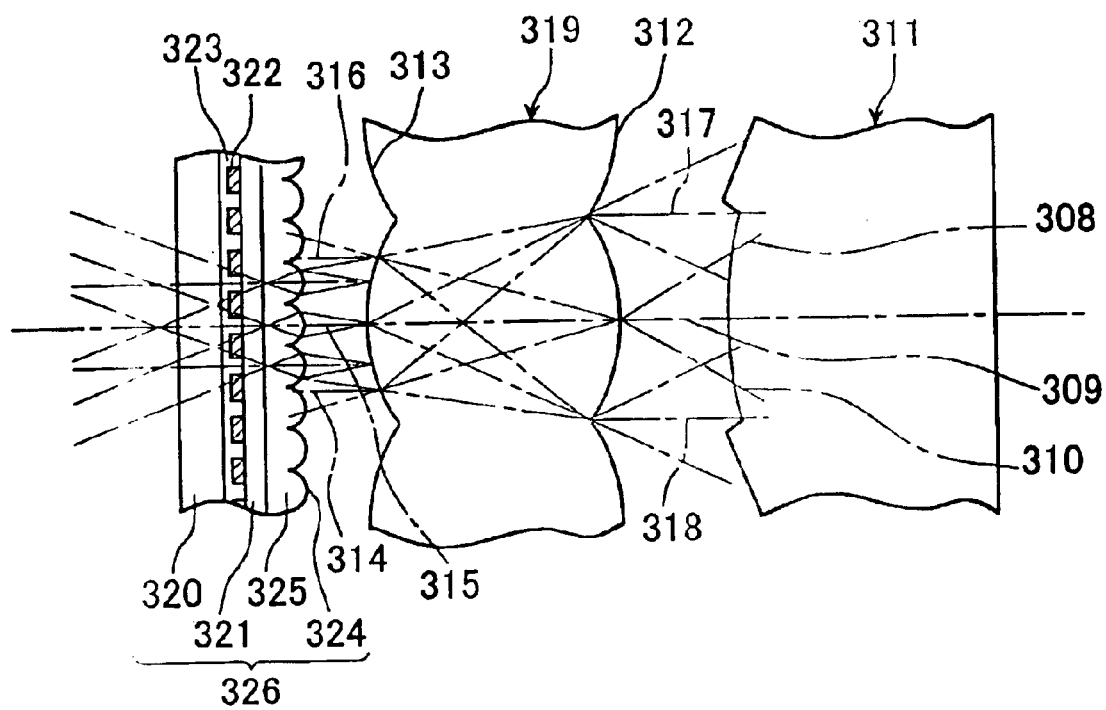
FIG. 4 is an enlarged cross-sectional view of a portion of a transparent screen shown in FIG. 3.

FIG. 3 is a plan view illustrating a schematic configuration of a rear-projection image display according to a first embodiment. FIG. 4 is an enlarged cross-sectional view of a portion in the vicinity of the screen shown in FIG. 3.

A projection-type image display 300 according to the present embodiment includes a trichromatic image projecting section 307, a Fresnel lens 311 as a collimating means, a lenticular lens sheet 319 as a color-shading eliminating means, and a black-stripe-type diffusing panel 326 as a light diffusing means, which are arranged in the stated order.

The trichromatic image projecting section 307 includes: red image display element (CRT) 301, a green image display element (CRT) 302, and a blue image display element (CRT) 303 that are linearly aligned in a horizontal direction; and illuminating lenses 304, 3305, and 306 that are provided in front of the image display elements, respectively. The image display elements 301, 302, and 303 carry out image display of colors, respectively, in response to input signals, and the respective images are enlarged and projected by the illuminating lenses 304, 305, and 306 onto the Fresnel lens 311.

The Fresnel lens 311 is disposed at a position such that distances from light outgoing pupils of the illuminating lenses 304, 305, and 306 to the Fresnel lens 311 are substantially equal to a focal length of the Fresnel lens 311. The Fresnel lens 311 converts the respective color lights from the trichromatic image display section 307 into lights substantially parallel to principal rays 308, 309, and 310 of color lights, and allows the respective color lights thus converted to outgo therefrom.

The lenticular lens sheet 319 includes lenticular lenses arrayed on both the surfaces thereof in the same direction at the same pitch with the respective lenticular lenses on both the surfaces opposing each other in a one-to-one correspondence. Each lenticular lens 312 on the light-incident side has a focal length substantially equal to a distance therefrom to the corresponding lenticular lens 313 on the light-exit side. Each lenticular lens 213 has a focal length substantially equal to a distance therefrom to the corresponding lenticular lens 312 on the light incident side.

Here, focusing on the respective principal rays 308, 309, and 310 of the color lights that are incident on a surface of the lenticular lens 312 at its center, the positions of incidence of these principal rays coincide with incident-side focal positions of the lenticular lens 313 on the light-exit side. As shown in FIG. 4, therefore, these rays are allowed to exit from the lenticular lens 313 as principal rays 314, 315, and 316 that are substantially parallel with each other. Further, focusing on green lights 317, 309, and 318 that enter the lenticular lens 312 as substantially parallel lights, these lights are converged to the center of a surface of the lenticular lens 313, since the focal position of the lenticular lens 312 coincides with the position of the lenticular lens 313. Likewise, red and blue lights enter the lenticular lens 312 as lights parallel with the principal rays 308 and 310, respectively. Hence, they are converged on the surface of the lenticular lens 313, at positions adjacent to the converging position of the foregoing green light.

The black-stripe-type diffusing panel 326 includes a lenticular lens sheet 325, a light diffusing layer 321, an adhesive 323, and a transparent panel 320 that are laminated in the stated order. On one surface of the lenticular lens sheet 325, a plurality of lenticular lenses 324 are formed in the same direction as the lenticular lenses 312 and 313 are arrayed. The other surface of the lenticular lens sheet 325 is flat, and is brought into contact with one surface of the light diffusing layer 321 that contains a light diffusing material. On the other surface of the light diffusing layer 321, black stripes 322 made of a black material that has a light absorbing property are provided. The black stripes 322 are formed in the same direction that in which the lenticular lenses 324 are arrived, in regions through which light does not pass due to the refracting effect of the lenticular lenses 324. The light diffusing layer 321 and the transparent panel 320 are laminated, by bringing a surface of the light diffusing layer 321 on which the black stripes 322 are formed into contact with the transparent panel 320, with the transparent adhesive 323 being provided therebetween. The black-stripe-type diffusing panel 326 thus configured is disposed with the lenticular lenses 324 facing the lenticular lens sheet 319.

The lenticular lenses 324 are arrayed, like the lenticular lenses 312 and 313, so as to provide a refracting effect in a horizontal direction with respect to the incident light. The pitch of the lenticular lenses 324 need not be equal to the pitch of the lenticular lenses 312 and 313, and further, the lenticular lenses 324 need not be provided so as to be in a one-to-one correspondence with the lenticular lenses 313. In the present embodiment, the pitch of the lenticular lenses 324 is set sufficiently small relative to the pitch of the lenticular lenses 313.

The black stripes 322 are formed on a plane including places at which the substantially parallel light incident on the lenticular lens sheet 325 is converged by the respective lenticular lenses 324. In other words, the focal length of the lenticular lenses 324 is set substantially equal to a sum of thicknesses of the lenticular lens sheet 325 and the light diffusing layer 321. The black stripes 322 are formed to extend in a vertical direction. Each of the spaces between the adjacent black stripes 322 is set to a minimum value in a range required for the light converged by the lenticular lenses 324 to pass therethrough.

Light from the image projecting section 307 is diffused in the horizontal direction by the lenticular lens sheet 325, and also is diffused in the vertical direction as well as in the horizontal direction by the diffusing plate 321. Thus, the black-stripe-type diffusing panel 326 can be used as a diffusing means that provides a greater angle of visibility.

The foregoing trichromatic image projecting section 307, Fresnel lens 311, lenticular lens sheet 319, and black stripe-type diffusing panel 326 are provided in a case, not shown, in which the black-stripe-type diffusing panel 326 constitutes a part of external surfaces of the case.

An area that the spaces between the black stripes 322 of the black-stripe-type diffusing panels 326 closest to the observer occupy is extremely small relative to the entire area of the diffusing panel 326, like in the first embodiment. Therefore, even when strong external light is incident from the observer side, most of the light is absorbed by the black stripes 322, thereby not to return to the observer side. Besides, light passing through the spaces between the black stripes 322 enters the case and does not return to pass through the spaces between the black stripes 322 again, thereby by no means being observed by the observer. Accordingly, sharp black can be provided at all times independently of an environment. On the other hand, since respective principal rays of color lights incident on the black-stripe-type diffusing panel 326 from the image projecting section 307 are substantially parallel to one another, color lights outgoing from the diffusing panel 326 have substantially equal outgoing angle distributions. Therefore, images that undergo no color shading but are reproduced with each color being uniform can be provided to the observer.

In the foregoing configuration, each of the lenticular lenses 312 of the lenticular lens sheet 319 as a color-shading eliminating means forms light-exit-aperture images of the illuminating lenses 304, 305, and 306 at different positions on the corresponding lenticular lenses 313 arranged to face the lenticular lenses 312. Here a thickness of the lenticular lens sheet 319 and a width of the lenticular lens 313 are determined so that light source images (light-exit-aperture images) of the three color lights fall within a width of each lenticular lens 313 (one pitch).

If the sheet 319 is formed thinner without changing the lens pitch, it is necessary to shorten the focal length of the lenticular lens 312. In this case, an image formed on the lenticular lens 313 can be made smaller, but a flare angle of the outgoing light increases. This makes it impossible to converge all the light incident on the black-stripe-type diffusing panel 326 to the spaces between the black stripes 322, and thus optical loss may be caused.

On the other hand, if the sheet 319 is formed thicker without changing the lens pitch, it is necessary to lengthen the focal length of the lenticular lens 312. In this case, an image formed on the lenticular lens 313 becomes larger. Accordingly, light likely fails to be incident on the corresponding lenticular lens 313, but is incident on adjacent lenses (stray light), and thus optical loss may be caused.

It is therefore desirable to employ a configuration excelling most in light utilization characteristics, by ascertaining: sizes of light-exit-aperture images of the illuminating lenses 304, 305, and 306, and spaces therebetween; distances from the illuminating lenses 304, 305, and 306 to the lenticular lens sheet 319; pitches and focal lengths of the lenticular lenses 312 and 313; and incident-angle-dependent characteristics of light transmittance of the black-stripe-type diffusing panel 326.

Furthermore, in the case where the light source images can be formed sufficiently small on the lenticular lenses 313, black stripes as a light absorbing layer may be provided in regions between adjacent lenticular lenses 313 where light source images are not formed. By so doing, image-quality degrading factors such as color mixture due to stray light can be removed surely.

In the foregoing black-stripe-type diffusing panel 326, the diffusing plate 321 on which the black stripes 322 are formed and the transparent panel 320 are bonded with each other with the adhesive 323 being provided therebetween. However, even when they are not bonded to each other but are disposed with an air layer interposed therebetween light from the image projecting section 307 can be utilized with substantially no optical loss.

Furthermore, though in the foregoing black-stripe-type diffusing panels 326, the black stripes 322 are formed on the light diffusing layer 321 laminated on the lenticular lens sheet 325, the black-stripe-type diffusing panel 326 of the present invention is not limited to such a configuration. For instance, as disclosed by JP 10(1998)-339915A, it mail be configured so that the black stripes 322 are provided on the side of the flat surface of the lenticular lens sheet 325, the light diffusing layer 321 is laminated on the transparent panel 320, and the lenticular lens sheet 325 is laminated with the light diffusing layer 321 using an adhesive so that the surface of the lenticular lens sheet 325 on which the black stripes 322 are formed is bonded to a surface of the light diffusing layer 321 with the adhesive interposed therebetween. In this case, it should be appreciated that the thickness of the lenticular lens sheet 325 is determined so that positions at which the parallel lights are focused by the respective lenticular lenses substantially coincide with those on the flat surface of the lenticular lens sheet 325. Incidentally, in the black-stripe-type diffusing panel thus configured, the black-stripes 322 formed surface of the lenticular lens sheet 325 and the light diffusing layer 321 need not be bonded to each other with an adhesive but may be disposed with an air layer interposed therebetween. However, when external light sometimes is diffused in the light diffusing layer and is incident on an interface with the air layer at a great angle of incidence, it may be reflected by the air layer and exit to the observer side. This causes black dimming. For this reason, desirably, the light diffusing layer surface and the black-stripes 322 formed surface of the lenticular lens sheet 325 are bonded to each other.

In the foregoing example, used as a color-shading eliminating means is the one-piece lenticular lens sheet 319 having the lenticular lenses 312 and 313 on both surfaces thereof, respectively. However, it may be formed with two pieces of lenticular lens sheets, as in the third embodiment described later.

The black-stripe-type diffusing panel 326 shown in the present embodiment enables angles of visibility to he designed in the horizontal direction and in the vertical direction individually, which is different from the case of the bead-type diffusing panel 224 in the first embodiment. Besides, the black-stripe-type diffusing panel 326 is characterized by being not subjected easily to degradation in image quality due to external light, which is different from a light diffusing means in the third embodiment described later. According to the second embodiment, therefore, it is possible to obtain higher image quality even in the case where an image display cannot provide extra brightness.

Third Embodiment

Figure 5:
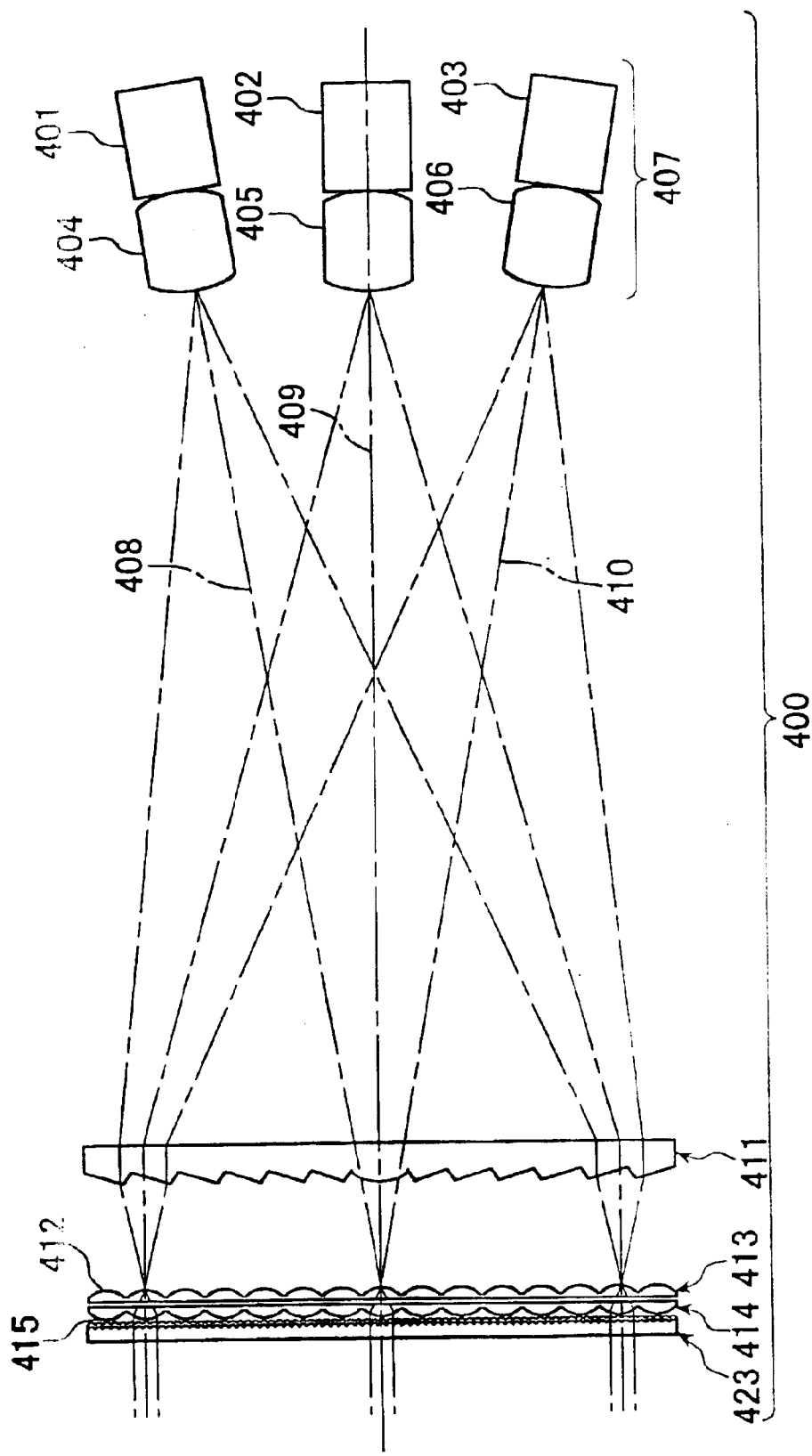
FIG. 5 is a view illustrating an overall configuration of a rear-projection image display according to a third embodiment of the present invention.
Figure 6:
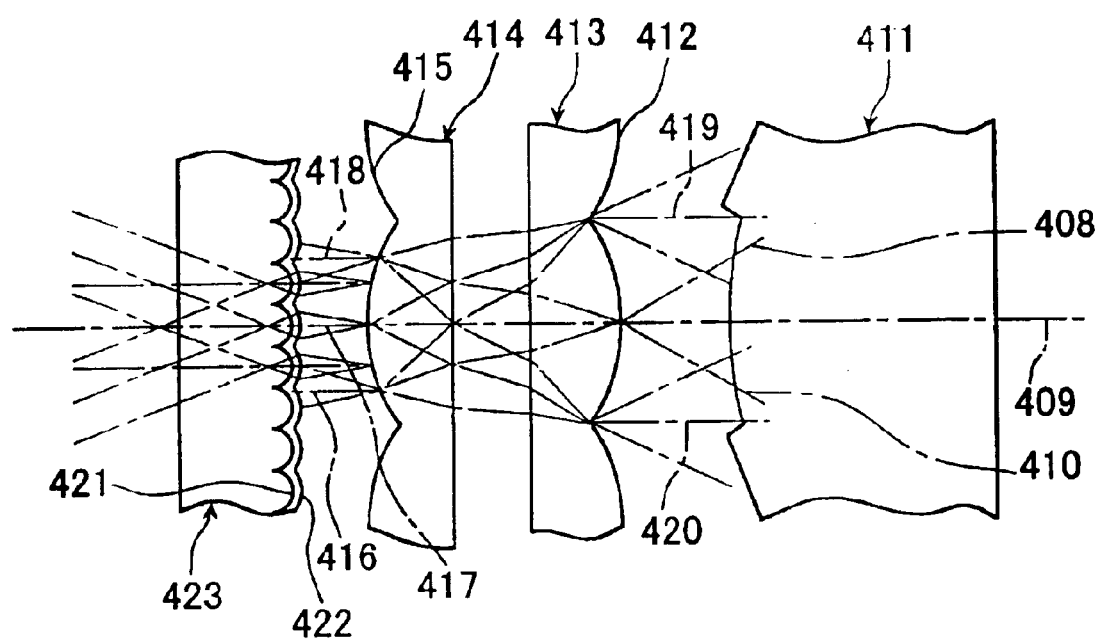
FIG. 6 is an enlarged cross-sectional view of a portion of a transparent screen shown in FIG. 5.
Figure 7:
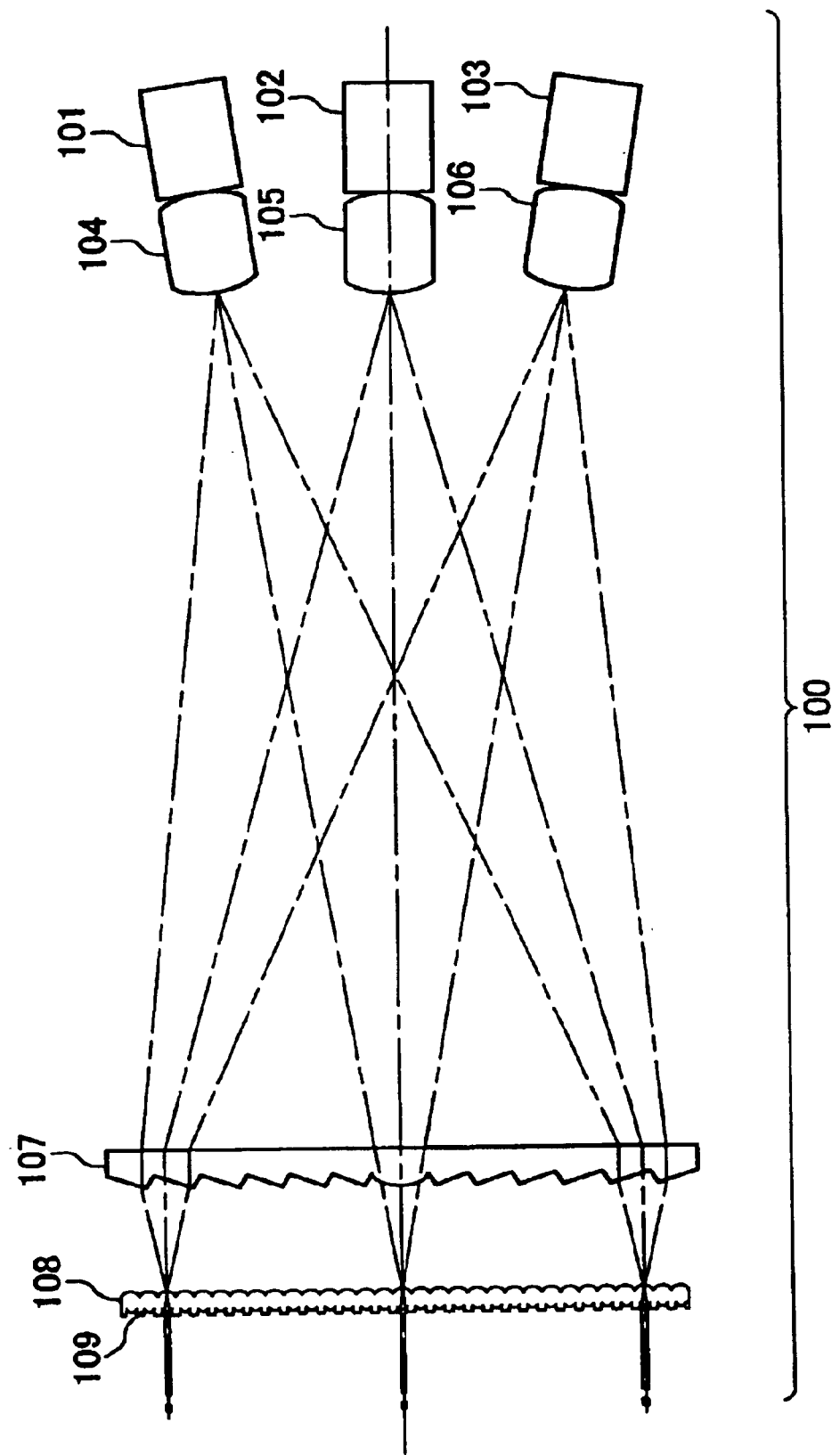
FIG. 7 is a view illustrating an overall configuration of a conventional three-tube rear-projection image display.
Figure 8:
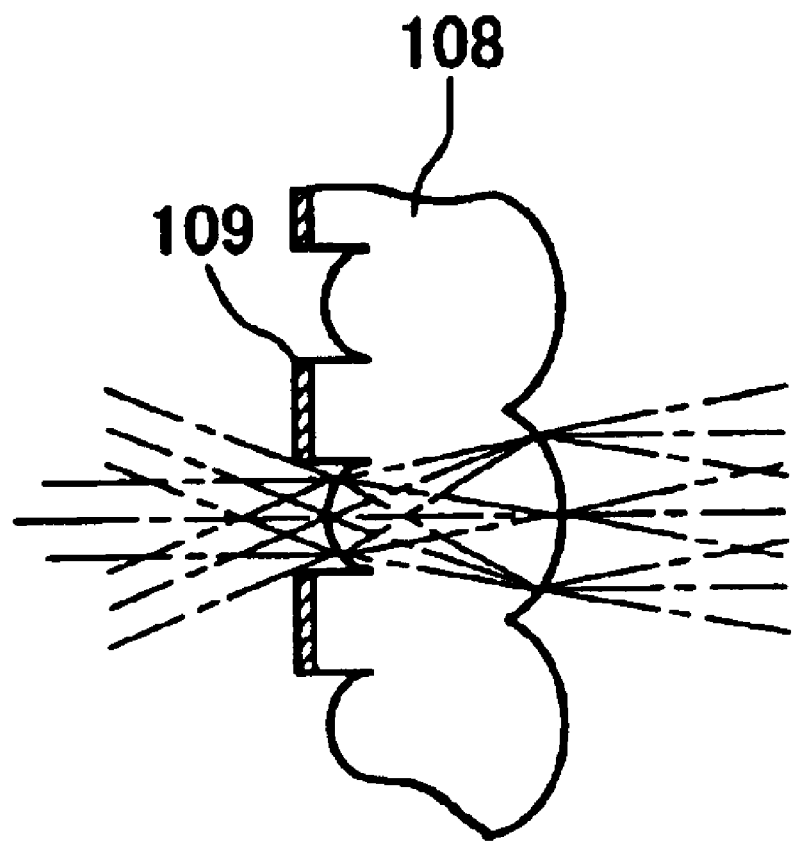
FIG. 8 is an enlarged cross-sectional view of a portion of a transparent screen shown in FIG. 7.
Figure 9:
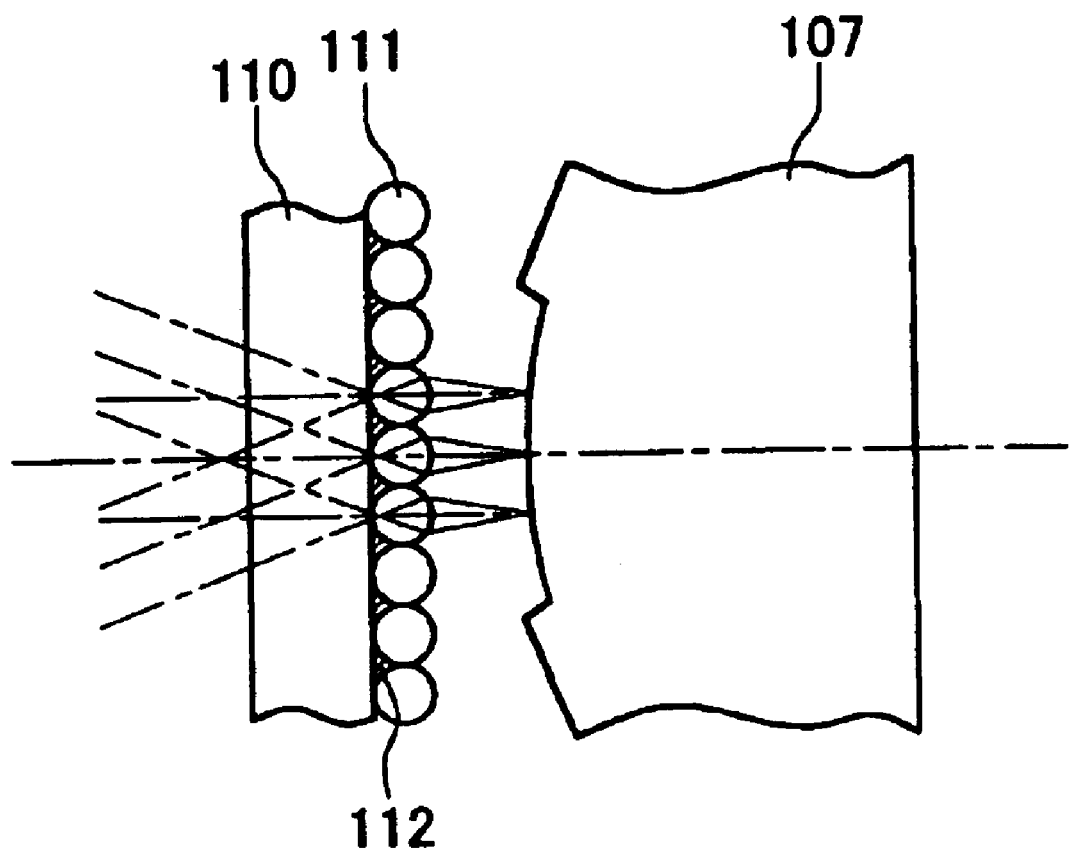
FIG. 9 is an enlarged cross-sectional view of a portion of a conventional transparent screen with transparent heads.
Figure 10:
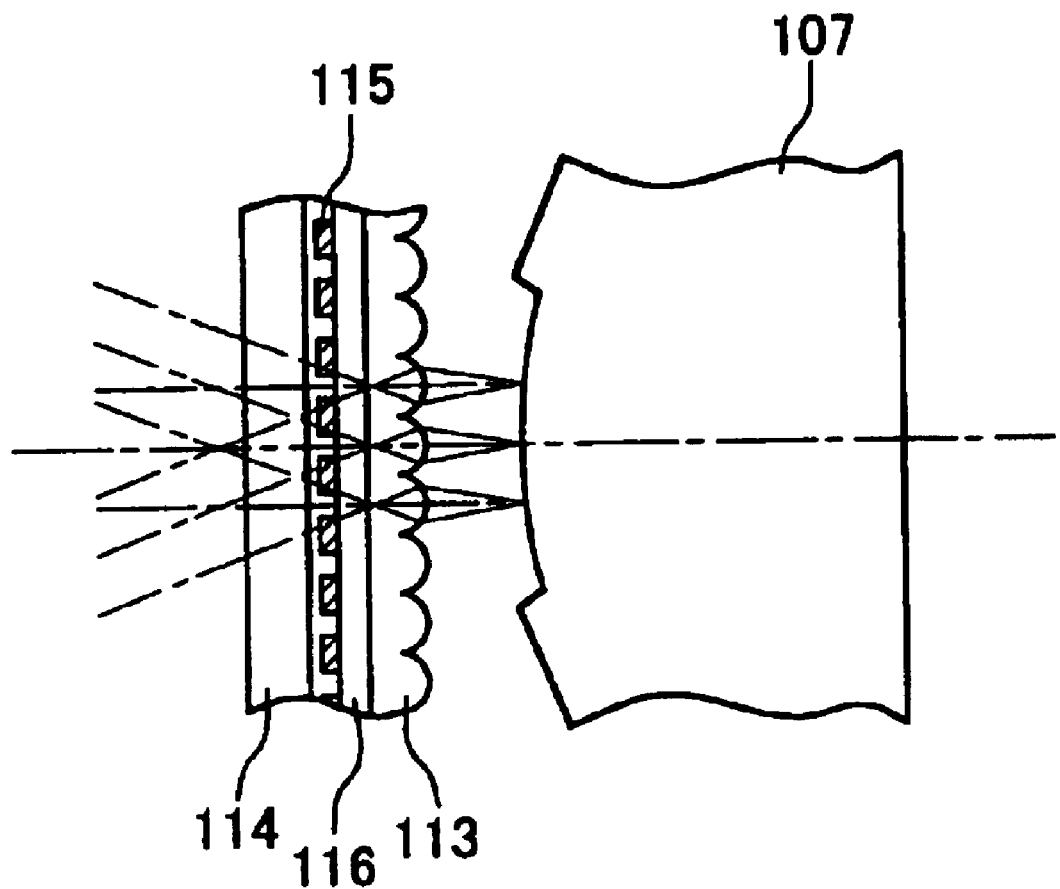
FIG. 10 is an enlarged cross-sectional view of a portion of a conventional transparent screen with black stripes.
Figure 11:
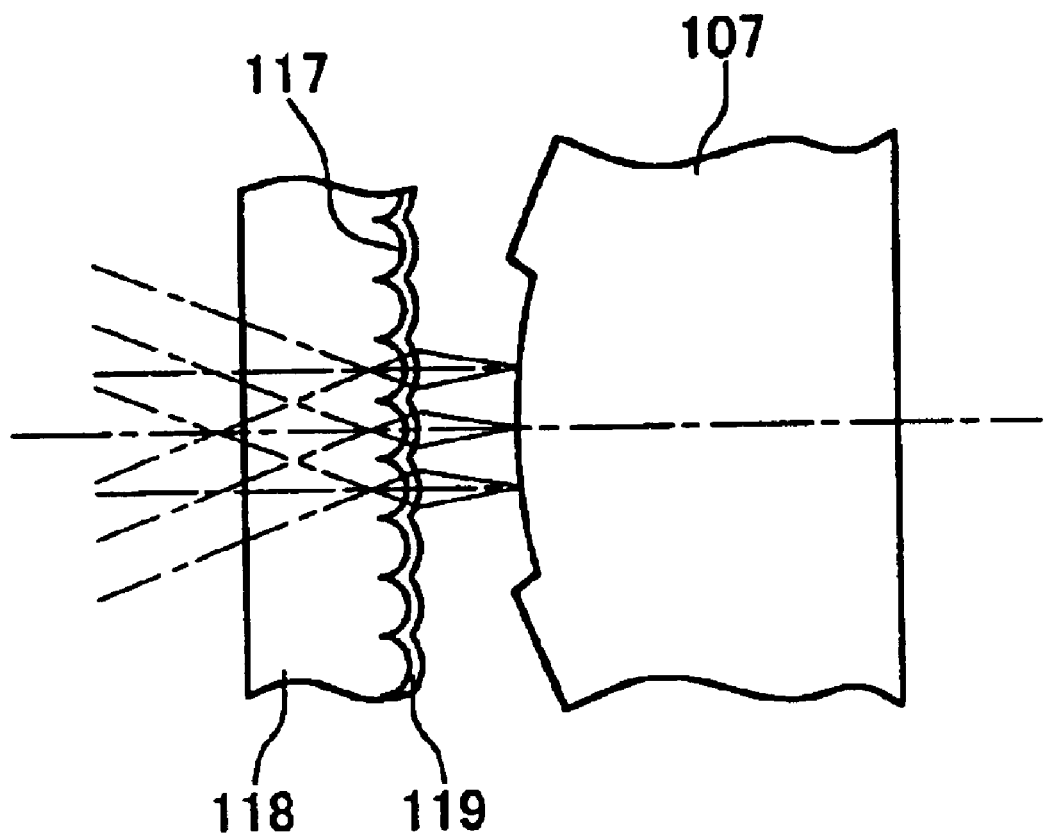
FIG. 11 is an enlarged cross-sectional view of a portion of a conventional transparent screen with a color layer.

FIG. 5 is a plan view illustrating a schematic configuration of a rear-projection image display according to a third embodiment. FIG. 6 is an enlarged cross-sectional view of a portion in the vicinity of the screen section shown in FIG. 5.

A projection-type image display 400 according to the present embodiment includes a trichromatic image projecting section 407, a Fresnel lens 411 as a collimating means, first and second lenticular lens sheets 413 and 414 as color-shading eliminating means, and a third lenticular lens sheet 423 as a light diffusing means, which are provided in the stated order.

The trichromatic image projecting section 407 includes red image display element (CRT) 401, a green image display element (CRT) 402, and a blue image display element (CRT) 403 that are linearly aligned in a horizontal direction; and illuminating lenses 404, 405, and 406 that are provided in front of the image display elements, respectively. The image display elements 401, 402, and 403 carry out image display of colors, respectively, according to input signals, and the respective images are enlarged and projected by the illuminating lenses 404, 405, and 406 onto the Fresnel lens 411.

The Fresnel lens 411 is disposed at a position such that distances from light exit apertures of the illuminating lenses 404, 405, and 406 to the Fresnel lens 411 are substantially equal to a focal length of the Fresnel lens 411. The Fresnel lens 411 converts the respective color lights from the trichromatic image display section 407 into lights substantially parallel to principal rays 408, 409, and 410 of color lights, and allows the respective color lights thus converted to exit therefrom.

The first lenticular lens sheet 413 and the second lenticular lens sheet 414 are disposed substantially in parallel at a predetermined distance therebetween. The first and second lenticular lens sheets 413 and 414 are provided with lenticular lenses 412 and 415, respectively, that are arrayed at the same pitch in the same direction on their surfaces opposite to surfaces facing each other. The lenticular lenses 412 provided on the light-incident surface of the first lenticular lens sheet 413, and the lenticular lenses 415 provided on the light-outgoing surface of the second lenticular lens sheet 414 are disposed opposing each other so as to have one to one correspondence. Each lenticular lens 412 of the first lenticular lens sheet 413 has a focal length substantially equal to a distance therefrom to the corresponding lenticular lens 415 of the second lenticular lens sheet 414, and each lenticular lens 415 has a focal length substantially equal to a distance therefrom to the corresponding lenticular lens 42.

Here, focusing on the respective principal rays 408, 409, and 410 of the color lights that are incident on surfaces of the lenticular lenses 412 at their centers, the positions of incidence of these principal rays coincide with incident-side focal positions of the lenticular lenses 415. As shown in FIG. 6, therefore, these rays are allowed to exit from the lenticular lenses 415 as principal rays 416, 417, and 418 that are substantially parallel with each other. Further, focusing on green lights 419, 409, and 420 that are incident on the lenticular lenses 412 as substantially parallel lights, these lights are converged to centers of surfaces of the lenticular lenses 415, since the focal positions of the lenticular lenses 412 coincide with positions of the lenticular lenses 415. Likewise, red and blue lights are incident on the lenticular lenses 412 as lights parallel with the principal rays 408 and 410, respectively. Hence, they are converged on surfaces of the lenticular lenses 415, at positions adjacent to the converging positions of the foregoing green light.

The third lenticular lens sheet 423 is configured so that a plurality of lenticular lenses 421 are provided on one surface, that the other surface is flat, and that a color layer 422 is formed on the lenticular lenses 421. The third lenticular lens sheet 423 is disposed so that the surface on which the lenticular lenses 421 are provided faces the second lenticular lens sheet 414.

The lenticular lenses 421 are arrayed so as to provide a refracting effect in the horizontal direction with respect to incident light, as is the case with the lenticular lenses 412 and 415. The pitch of the lenticular lenses 421 need not be matched with the pitch of the lenticular lenses 412 and 415, and the lenticular lenses 421 need not be provided so as to be in a one to one correspondence with the lenticular lenses 415. In the present embodiment, the pitch of lenticular lenses 421 is set substantially smaller than the pitch of the lenticular lenses 415.

The color layer 422 is colored by containing a dye or a fine pigment mixed or dispersed therein. On the other hand, a substrate on which the lenticular lenses 421 are provided is not colored in such a manner, or is colored to have a lighter tint than that of the color layer 422. As a result, the color layer 422 has a light transmittance lower than that of the substrate.

Light from the image projecting section 407 is diffused in the horizontal direction by the third lenticular lens sheet 423. The third lenticular lens sheet 423 therefore can be used as a diffusing means that provides a greater angle of visibility.

The above-described trichromatic image projecting section 407, Fresnel lens 411, first and second lenticular lens sheets 413 and 414, and third lenticular lens sheet 423 are placed in a case, not shown in the figures, in which the third lenticular lens sheet 423 constitutes a part of external surfaces of the case.

Here, the following discussion is directed to the case where external light enters the third lenticular lens sheet 423 that is closest to the observer. Among external light reaching the color layer 422, light incident on the color layer 422 at a small angle of incidence passes through the color layer 422, and is absorbed in the case, thereby by no means returning to the color layer again to be observed by the observer. Besides, light incident on the color layer 422 at a large angle of incidence passes through the color layer 422 while repeating total reflection at the interface between the color layer 422 and the air layer, thereby exiting to the observer side. Most of the light however is absorbed in an optical path within the color layer 122, and thus little of the light returns to the observer side. Accordingly, sharp black can be provided at all times, without depending on conditions. On the other hand, since respective principal rays of color lights incident from the image projecting section 407 onto the third lenticular lens sheet 423 are substantially parallel with one another, color lights outgoing from the third lenticular lens sheet 423 have substantially equal outgoing angle distributions. Therefore, images that undergo no color shading but are reproduced with each color being uniform can be provided to the observer. Incidentally, image light also passes through the color layer 422. However, an optical path length of the image light within the color layer 422 is much shorter than that of the external light. Hence, a decrease in the intensity of image light does not matter in practical use.

In the foregoing configuration, each of the lenticular lenses 412 of the first lenticular lens sheet 413 as a color-shading eliminating means forms light-exit-aperture images of the illuminating lenses 404, 405, and 406 at different positions on the corresponding lenticular lens 415 arranged to face the lenticular lens 412. Here, a distance between the lenticular lens 412 and the lenticular lens 415 (or, thicknesses of the first and second lenticular lens sheets 413 and 414), and a width of the lenticular lens 415 are determined so that light source images (light-exit-aperture images) of the three color lights fall within a width of each lenticular lens 415 (one pitch).

If a distance between the lenticular lanes 412 and the lenticular lens 415 is decreased without changing the lens pitch, it is necessary to shorten the focal length of the lenticular lens 412. In this case, an image formed on the lenticular lens 415 can be made smaller, but a flare angle of the outgoing light increases. Consequently, total reflection may be caused by the surface of the third lenticular lens sheet 423 on the light-incident side, or the exit angle exceeds a necessary angle of visibility, which makes it impossible to obtain a display image with a desired brightness.

On the other hand, if the distance between the lenticular lens 412 and the lenticular lens 415 is increased without changing the lens pitch, it is necessary to lengthen the focal length of the lenticular lens 412. In this case, an image formed on the lenticular lens 415 becomes larger. Accordingly, light likely fails to be incident on the corresponding lenticular lens 415, but is incident on adjacent lenses (stray light), and thus optical loss may be caused.

It is therefore desirable to employ a configuration excelling most in light utilization efficiency, by ascertaining: sizes of light-exit aperture images of the illuminating lenses 404, 405, and 406, and spaces therebetween; distances from the illuminating lenses 404, 405, and 406 to the first lenticular lens sheet 413; pitches and focal lengths of the lenticular lenses 412 and 415; and incident-angle-dependent characteristics of light transmittance of the third lenticular lens sheet 423.

Furthermore, in the case where the light source images can be formed sufficiently small on the lenticular lenses 415, black stripes as a light absorbing layer may be provided in regions between adjacent lenticular lenses 415 where light source images ale not formed. By so doing, image-quality degrading factors such as color mixture due to stray light can be surely removed.

In the foregoing example, a color-shading eliminating means is composed of two lenticular lens sheets 413 and 414. However, a one-piece lenticular lens sheet having lenticular lenses on both surfaces thereof may be used, as shown in the first and second embodiments.

The third lenticular lens sheet 423 shown in the )resent embodiment tends to undergo image quality degradation due to external light as compared with the light diffusing means in the first and second embodiments. As compared with the bead-type diffusing panel 224 in the first embodiment, however, it is possible to design the angles of visibility in the horizontal direction and in the vertical direction, individually. Besides, the third lenticular lens sheet 423 has a great advantage of being manufactured at low cost by extrusion (molding) or the like, as compared with the light diffusing means in the first and second embodiments. According to the third embodiment, therefore, high image quality can be achieved at relatively lower costs, even in the case where an image display cannot provide extra brightness.

In the aforementioned first through third embodiments, image display is conducted using CRTs, but the present invention is not necessarily limited to this, and it is also possible to use a light valve such as liquid crystal to conduct image display.

Furthermore, in order to decrease a dimension in the depth direction, a reflection mirror may be provided between the trichromatic image projecting section and the transparent screen.

The embodiments described above merely intend to clarify technical details of the present invention and the present invention should not be interpreted as being limited to such specific examples. The present invention can be carried out by being modified variously within a range of claims and without departing from its spirit and should be interpreted broadly.

What is claimed is:

1. A rear-projection image display, comprising:
   a trichromatic image projecting section including three image projecting sections corresponding to colors of red, green, and blue, respectively, the three image projecting sections being arrayed in one horizontal plane, each of the three image projecting sections including an image display element for displaying an image according to an input signal, and an illuminating lens for enlarging and projecting the image displayed by the image display element; and
   a transparent screen on which images formed with respective color lights projected by the trichromatic image projecting section are superimposed to be displayed, wherein:
   the transparent screen includes, in an order firm a side of the trichromatic image projecting section;
   a collimating means for converting incident light having a predetermined flare angle form each of the image projecting sections into telecentric light and allowing the telecentric light to exit therefrom;
   a color-shading eliminating means having, on its light-incident surface, light-incident-side lenticular lenses for converging incident light from the collimating means in a horizontal plane, and on its light-outgoing surface, light-exit-side lenticular lenses having one-to-one correspondence to the light-incident-side lenticular lenses, so as to allow principal rays of the respective lights of the colors to be substantially parallel with one another and to exit, the respective lights being from the image projecting sections and having passed through the collimating means; and
   a light diffusing means including a substrate sheet made of a transparent material and a plurality of micro beads made of a transparent material provided on the light-incident surface of the substrate sheet, light transmitting portions being formed between the substrate sheet and the micro beads, and the light-incident surface of the substrate sheet except for the light transmitting portions is covered with an opaque binder.

2. A rear-projection image display, comprising:
   a trichromatic image projecting section including three image projecting sections corresponding to colors of red, green, and blue, respectively, the three image projecting sections being arrayed in one horizontal plane, each of the three image projecting sections including an image display element for displaying an image according to an input signal, and an illuminating lens for enlarging and projecting the image displayed by the image display element; and
   a transparent screen on which images formed with respective color lights projected by the trichromatic image projecting section are superimposed to be displayed, wherein:
   the transparent screen includes, in an order from a side of the trichromatic image projecting section;
   a collimating means for converting incident light having a predetermined flare angle from each of the image projecting sections into telecentric light and allowing the telecentric light to exit therefrom;
   a color-shading eliminating means having, on its light-incident surface, light-incident-side lenticular lenses for converging incident light from the collimating means in a horizontal plane, and on its light-outgoing surface light-exit-side lenticular lenses having one-to-one correspondence to the light-incident-side lenticular lens, so as to allow principal rays of the respective lights of the colors to be substantially parallel with one another and to exit, the respective lights being from the image projecting sections and having passed through the collimating means; and
   a light diffusing means including, on its light-incident surface, lenticular lenses that converge incident light from the color-shading eliminating means in a horizontal plane, black stripes formed with a material having a light absorbing property in a region except for places where the incident light is converged and vicinities thereof, and a light diffusing layer made of a material containing a light diffusing material.

3. A rear-projection image display, comprising:
   a trichromatic image projecting section including the image projecting sections corresponding to colors of red, green, and blue, respectively, the three image projecting sections being arrayed in one horizontal plane, each of the three image projecting sections including an image display element for displaying an image according to an input sign, and an illuminating lens for enlarging and projecting the image displayed by the image display element; and
   a transparent screen on which images formed with respective color lights projected by the trichromatic image projecting section are superimposed to be displayed, wherein:
   the transparent screen includes, in an order from a side of the trichromatic image projecting section;
   a collimating means for converting incident light having a predetermined flare angle from each of the image projecting sections into telecentric light and allowing the telecentric light to exit therefrom;
   a color-shading eliminating means having, on its light-incident surface, light-incident-side lenticular lenses for converging incident light from the collimating means in a horizontal plane, and on its light-outgoing surface, light-exit-side lenticular lenses having one-to-one correspondence to the light-incident-side lenticular lenses, so as to allow principal rays of the respective lights of the colors to be substantially parallel with one another and to exit, the respective lights being from the image projecting sections and having passed through the collimating means; and a light diffusing means including a substrate having, on its light-incident surface, lenticular lenses for converging incident light from the color-shading eliminating means in a horizontal plane, and a color layer formed at least in vicinities of light-incident surfaces of the lenticular lenses, a material of the substrate being non-colored, or colored to have a tint lighter than that of the color layer.

4. The rear-projection image display according to any one of claims 1 to 3, wherein the collimating means is a Fresnel lens sheet and its focal length is substantially equal to a distance from the collimating means to each of the three image projecting sections.

5. The rear-projection image display according to any one of claims 1 to 3, wherein the light-exit-side lenticular lenses of the color-shading eliminating means are placed substantially at positions where the light-incident-side lenticular lenses form images, respectively.

6. The rear-projection image display according to any one of claims 1 to 3. wherein a focal length of each of the light-exit-side lenticular lenses of the color-shading eliminating means is substantially equal to a distance therefrom to corresponding one of the light-incident-side lenticular lenses.

7. The rear-projection image display according to any one of claims 1 to 3, wherein each of the light-exit-side lenticular lenses of the color-shading eliminating means has a width in a horizontal directions, the width covering an area where an image of the trichromatic image projecting section is formed by each of the light-incident-side lenticular lenses corresponding to each of the light-exit-side lenticular lenses.

8. The rear-projection image display according to any one of claims 1 to 3, wherein:

a width in a horizontal direction of the light-exit-side lenticular lenses of the color-shading eliminating means is narrower than a width in the horizontal direction of the light-incident-side lenticular lenses; and a light absorbing agent is applied to spaces between any adjacent two of the light-exit-side lenticular lenses.

9. The rear-projection image display according to any one of claims 1 to 3, wherein the color-shading eliminating means is a lenticular lens sheet provided with the light-incident-side lenticular lenses on one surface thereof, and the light exit-side lenticular lenses on the other surface thereof.

* * * * *